O. W. ANDERSON.
PISTON RING.
APPLICATION FILED APR. 18, 1917.

1,336,670.

Patented Apr. 13, 1920.

Inventor
Oscar W. Anderson
By Thurs. Anderman
Attorney

UNITED STATES PATENT OFFICE.

OSCAR W. ANDERSON, OF VALLEY CITY, NORTH DAKOTA.

PISTON-RING.

1,336,670.  Specification of Letters Patent.  Patented Apr. 13, 1920.

Application filed April 18, 1917. Serial No. 162,977.

*To all whom it may concern:*

Be it known that I, OSCAR W. ANDERSON, a citizen of the United States of America, and resident of Valley City, in the county of Barnes and State of North Dakota, have invented certain new and useful Improvements in Piston-Rings, of which the following is a specification.

This invention relates to a piston ring having for its object to secure equal tension or pressure between the face of the cylinder wall and the piston ring and tension or pressure between the sides of the ring and the walls of the groove in a piston in which the ring is placed, and to secure contact between the surface of the entire ring and the wall of the cylinder, to compensate for wear in the ring and to form a tight or leak proof closure under high pressure, without binding or wedging in the cylinder.

The tendency of modern times is to increase the pressure in cylinders, and tight rings are of great importance. This ring is designed to meet this demand and is a distinct advance in the art.

A further object of this invention is to produce split rings arranged in pairs and having novel means for holding the said rings in coöperative relation and in a manner to prevent rotation of one with respect to the other; furthermore, to provide novel means whereby the coacting rings establish a tight closure or leak-proof contact with a wall of a cylinder and with the sides of the groove in a piston in which the rings are placed, even when employed in motors having high pressure.

Furthermore, an object of the invention is to produce coacting rings whereby one of said rings reinforces the other of the said rings and in which the tension and pressure is equalized throughout the circumference of the ring in order that compensation will be had for wearing of the parts and the composite ring will remain quiet and effective.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification, wherein like characters denote corresponding parts in the several views, and in which—

Figure 1:
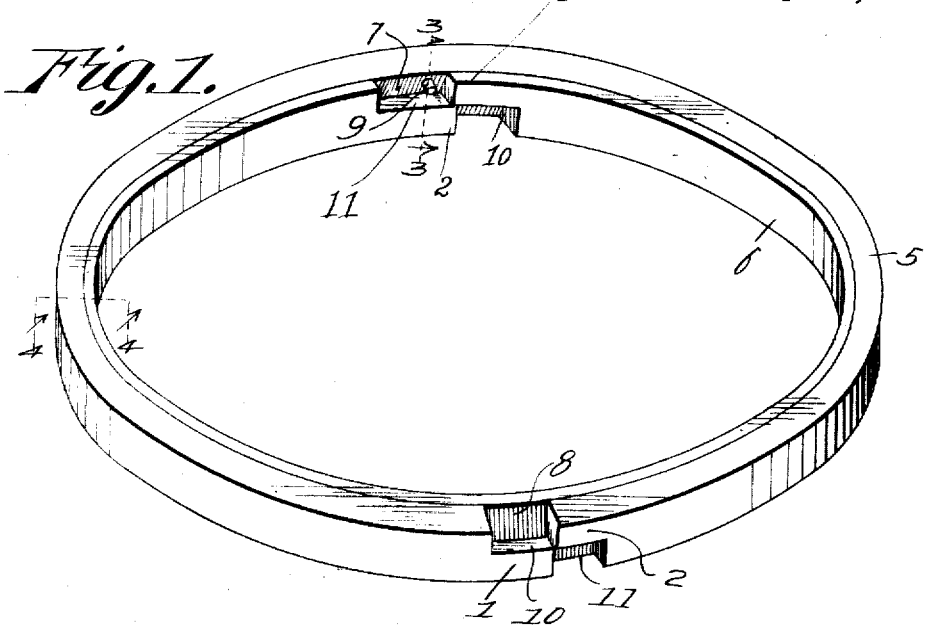
Figure 1 illustrates a view in perspective of a piston ring embodying the invention.
Figure 2:
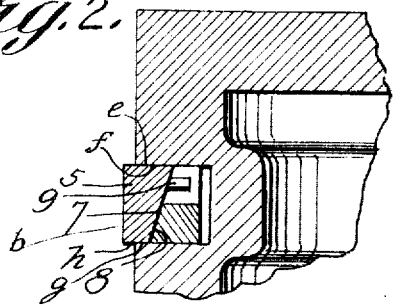
Fig. 2 illustrates a sectional view of a fragment of a piston with a ring installed therein, the ring being sectioned on the line 3—3 of Fig. 1.
Figure 3:
Fig. 3 illustrates a sectional view on the line 4—4 of Fig. 1.

The piston ring is made up of an outer split ring 5 and an inner split ring 6, the joint of one ring being preferably opposite the joint of the other ring, so that the split rings will create equal tension throughout the circumference of the ring when in assembled relation.

The contacting surfaces of the split rings are oppositely beveled and in the present illustration, the inner surface 7 of the outer ring is beveled downwardly and the outer surface 8 of the inner ring is tapered upwardly, the angle of the bevel being approximately 12° to 15°.

The outer ring 5 has a bearing surface or side $f$ resting against the wall of the annular groove in the piston, and a shorter surface or side $h$ designed to take up wear on the ring 6 and also to prevent wedging in the cylinder. The sides $f$ and $h$ bear against the walls $c$ and $g$ of the annular groove in the piston.

$1$ is the primary lap and $2$ is the secondary lap of the outer ring. A pin 9 is rigidly secured in the thick part of the outer ring and projects into the lap of the inner ring. 10 and 11 represent the faces of the two laps and which by means of the tension exerted by the beveled surfaces of the two parts of the ring are held together under constant pressure.

The rings 5 and 6 are so made that they coöperate and are sprung into the piston groove. The spring action of the ring 6 holds the surface $b$ against the surface of the cylinder. The ring 6 is so placed within the ring 5 that its greatest point of tension is at the weakest point of tension of the ring 5, and the two rings, being of equal tension, coöperate with each other and produce an equal tension or pressure all around the cylinder wall. The angle of the beveled surfaces 7 and 8 and the tension of the ring 5 spreads the rings laterally, making a tight closure with the walls $e$ and $g$ of the annular groove. This construction produces not only a tight surface of the ring with the wall of the cylinder and of equal tension at all points around the cylinder but produces a constant tension, by reason of the bevel and tension of the inner ring, laterally, and holds it against the walls of the annular piston groove in which the ring lies, and thus produces tight and leak-proof closures at the surface as well as at the sides of the ring. It further provides a ring which will have its entire surface in contact with the wall of the cylinder, and which can be perfectly machined and practically produced, and provides a ring that will not wedge in the cylinder, and further provides a ring that automatically spreads laterally and is held tight against the walls of the annular piston groove, and which will remain quiet and tight.

The outer ring is lapped to compensate for wear and as the outer surface of the ring is gradually worn away, this manner of joining the outer ring will produce a tight joint even after wear as the tension and bevel of the inside ring will force the lower lap against the upper lap and hold them together under pressure.

The function of the pin 9 is simply to prevent a rotation of the rings upon each other and to so hold the rings in position as to make the tension of the ring at all points equal against the walls of the cylinder.

I claim—

A piston ring construction comprising an outer ring beveled in cross section and having a lapped joint, an inner ring having a lapped joint, a locking pin rigidly secured to the thick portion of the outer ring, and projecting into the primary slot of the lapped joint of the inner ring, and holding the rings in such a manner as to prevent one from rotating upon the other, the outer ring having an outer cylindrical surface for making a tight closure against the wall of the cylinder with the entire surface of the ring, a primary side at right angles with the outer surface for making a tight closure with the wall of the annular groove of the piston in which the ring lies, a secondary side of less thickness than the primary side at right angles with the outer surface to secure the said ring from wedging between the piston and the cylinder and to preserve a uniform bearing surface of the ring with relation to the cylinder, a beveled inner cylinder ring fitted into and so coöperating with the bevel of the outside ring, under tension as to press the outside ring outward and laterally when the ring is placed in the annular groove of the piston, thereby pressing the faces of the lapped joint together under tension, whereby the lateral pressure will hold the faces of the lap together under tension and produce a leak-proof closure, the tension of the inner ring against the beveled surface of the outer ring automatically taking up wear on the outer ring and holding the surfaces of the lapped joint together under tension and pressure.

OSCAR W. ANDERSON.